United States Patent
Friedrichs et al.

(10) Patent No.: US 6,955,184 B2
(45) Date of Patent: Oct. 18, 2005

(54) PNEUMATIC GENERATOR SYSTEM FOR SIMULATING OPERATING CONDITIONS OF AN AIRCRAFT

(75) Inventors: Hans Peter Friedrichs, Tucson, AZ (US); Rondo K. Hubbard, San Manuel, AZ (US)

(73) Assignee: Honeywell International, Inc., Morristown, NJ (US)

( * ) Notice: Subject to any disclaimer, the term of this patent is extended or adjusted under 35 U.S.C. 154(b) by 81 days.

(21) Appl. No.: 10/447,805

(22) Filed: May 29, 2003

(65) Prior Publication Data

US 2004/0238039 A1 Dec. 2, 2004

(51) Int. Cl.[7] .......................... G01M 3/26; G01L 27/00
(52) U.S. Cl. ................ 137/487.5; 137/613; 73/40; 374/143; 434/53; 702/140
(58) Field of Search ................ 137/487.5, 613; 73/40.5 R, 49.2, 40, 714; 702/51, 140; 434/53

(56) References Cited

U.S. PATENT DOCUMENTS

| | | | | |
|---|---|---|---|---|
| 3,800,586 A | * | 4/1974 | Delatore et al. ............. | 73/49.2 |
| 3,878,376 A | * | 4/1975 | Sholes et al. ............... | 700/281 |
| 4,086,804 A | * | 5/1978 | Ruby ......................... | 73/1.64 |
| 4,811,252 A | * | 3/1989 | Furuse ....................... | 702/51 |
| 5,367,797 A | * | 11/1994 | Zaim .......................... | 73/49.2 |
| 5,642,278 A | * | 6/1997 | Wang et al. ................. | 700/29 |
| 5,756,899 A | * | 5/1998 | Ugai et al. .................. | 73/714 |
| 6,532,800 B1 | * | 3/2003 | Boeckstiegel et al. ....... | 73/40.5 |

FOREIGN PATENT DOCUMENTS

EP   0 710 905 A1  * 5/1996

* cited by examiner

*Primary Examiner*—Ramesh Krishnamurthy
(74) *Attorney, Agent, or Firm*—Ingrassia Fisher & Lorenz

(57) ABSTRACT

A pneumatic function generator system for maintaining a desired pressure and/or a desired rate of pressure change with respect to time. The pneumatic function generator system may include a servo valve for controlling the amount of fluid traveling therethrough, a primary sensor for measuring the pressure of the fluid and for generating an analog signal corresponding to the pressure of the fluid, an analog-to-digital module for converting the analog signal to a digital value, and a digital device for receiving the digital value and, depending on the digital value, generating a control signal that is used to control the opening and closing of the servo valve.

18 Claims, 5 Drawing Sheets

PNEUMATIC GENERATOR SYSTEM FOR SIMULATING OPERATING CONDITIONS OF AN AIRCRAFT

BACKGROUND OF THE INVENTION

1. Field of the Invention

The present invention relates generally to a pneumatic signal generator for testing sensors and instrumentation, and more particularly to a ground-based pneumatic generator system for simulating operating pressure conditions of an aircraft.

2. Description of the Related Art

Pneumatic function generator (PFG) systems are used to control the pressure of a particular space by outputting a desired pressure and/or regulating a rate of pressure change per unit time. Such a system can be used, for example, to calibrate or test pressure sensors. FIG. 1 is a block diagram of a prior art PFG system 100, which includes a pressure servo valve 102, a control signal generator 104, an isolation valve 106, a sensor 108, and an output port 110. The pressure servo valve 102 directly controls the amount of pressure or vacuum being directed to the output port 110. Using the sensor 108, the PFG system 100 provides closed-loop control of the pressure and rate of change of pressure as air or other gases are being output from the output port 110. In particular, the sensor 108 measures the pressure and/or the rate of change of pressure and provides data to the control signal generator 104, which outputs a control signal to adjust the pressure servo valve 102. The control signal may output a positive value to increase the pressure or a negative value to decrease the pressure. One drawback of conventional PFG systems is the non-linear changes to the pressure being output from the output port 110.

The PFG system 100 may be used to test the seal integrity of external pneumatics by implementing what is referred to as a "leak check". A typical leak check involves driving the external pneumatic to a specific pressure and then closing the isolation valve 106 to isolate the pressure servo valve 102 from an external load 112, which is connected to the output port 110. The sensor 108 is connected to the output port 110 to monitor the pressure in the external pneumatic and to detect changes in the pressure that might be indicative of leaks.

The arrangement shown in FIG. 1, however, causes the pressure servo valve 102 to be part of an open-loop configuration when a leak check is performed. This means that given a sufficient amount of time, the pressure on the pressure servo valve side will eventually rail, either to maximum pressure or maximum vacuum. This can result in potentially hazardous conditions if a significant pressure delta appears across the isolation valve 106. When the isolation valve 106 is eventually reopened, the pneumatic pressure rapidly seeks to equalize itself. This rapid equalization of pressure may result in a hammer effect causing undesirable stress or damage to the sensor 108 or the external load 112. In addition, conventional PFG systems are susceptible to the effects of temperature, aging, component drift, and wear and tear of the pressure servo valve components, which ultimately degrade the performance of the PFG system 100.

Thus, it should be appreciated that there is a need for a pneumatic generator system that overcomes the drawbacks of conventional PFG systems. The present invention fulfills this need as well as others.

SUMMARY OF THE INVENTION

The present invention relates to a pneumatic function generator system for maintaining a desired pressure and/or a desired rate of pressure change with respect to time. In particular, and by way of example only, one embodiment of the pneumatic function generator system may include a servo valve for controlling the amount of fluid traveling therethrough, a primary sensor for measuring the pressure of the fluid and for generating an analog signal corresponding to the pressure of the fluid, an analog-to-digital module for converting the analog signal to a digital value, and a digital device for receiving the digital value and, depending on the digital value, generating a control signal that is used to control the opening and closing of the servo valve.

Another embodiment of the present invention is a method for controlling a servo valve to achieve a desired rate of pressure change. The method may include the steps of receiving a desired rate value, translating the desired rate value to a rate command, determining a pressure value for a plurality of time values, performing a least-squares curve fit using the pressure and time values, determining an actual rate by calculating the slope of the least-squares curve fit, and adjusting the servo valve based on the difference between the rate command and the actual rate.

Another embodiment of the present invention is a method for controlling the temperature of a sensor. The method may include the steps of receiving a desired temperature value, determining a nominal duty cycle for a sensor, measuring the temperature using a temperature sensor, and comparing the desired temperature to the measured temperature. If the desired temperature is greater than the measured temperature, then the nominal duty cycle is increased. If the desired temperature is less than the measured temperature, then the nominal duty cycle is decreased.

These and other features and advantages of the embodiments of the invention will become apparent from the following detailed description, taken in conjunction with the accompanying drawings, which illustrate, by way of example the principles of the invention.

DETAILED DESCRIPTION OF THE PRESENTLY PREFERRED EMBODIMENTS

Systems and methods that implement the embodiments of the various features of the present invention will now be described with reference to the drawings. The drawings and the associated descriptions are provided to illustrate embodiments of the present invention and not to limit the scope of the present invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" in various places in the specification are not necessarily all referring to the same embodiment. Throughout the drawings, reference numbers are re-used to indicate correspondence between referenced elements. In addition, the first digit of each reference number indicates the figure in which the element first appears.

Figure 1:
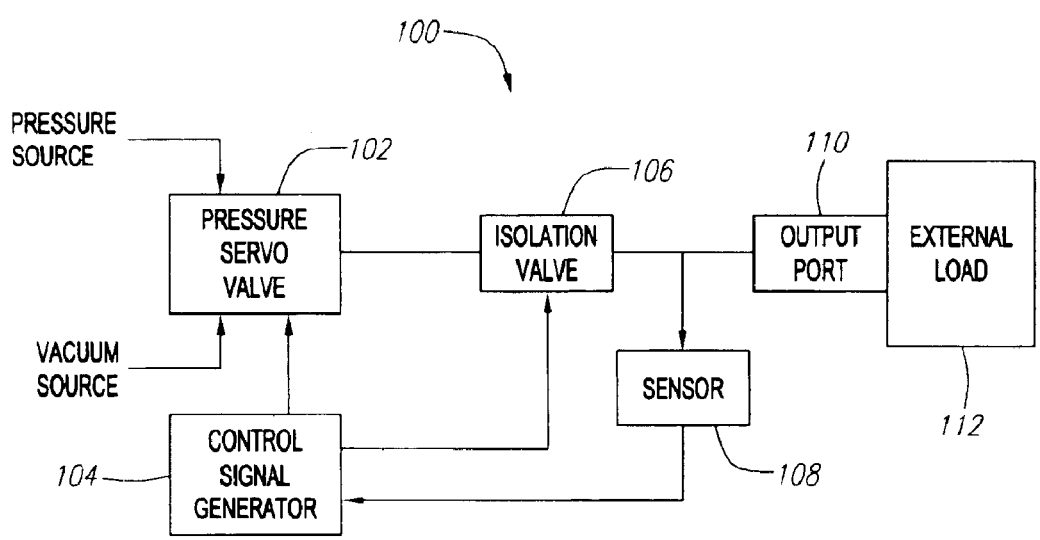
FIG. 1 is a block diagram of a prior art pneumatic function generator system, which includes a pressure servo valve, a control signal generator, an isolation valve, a sensor and an output port.
Figure 2:
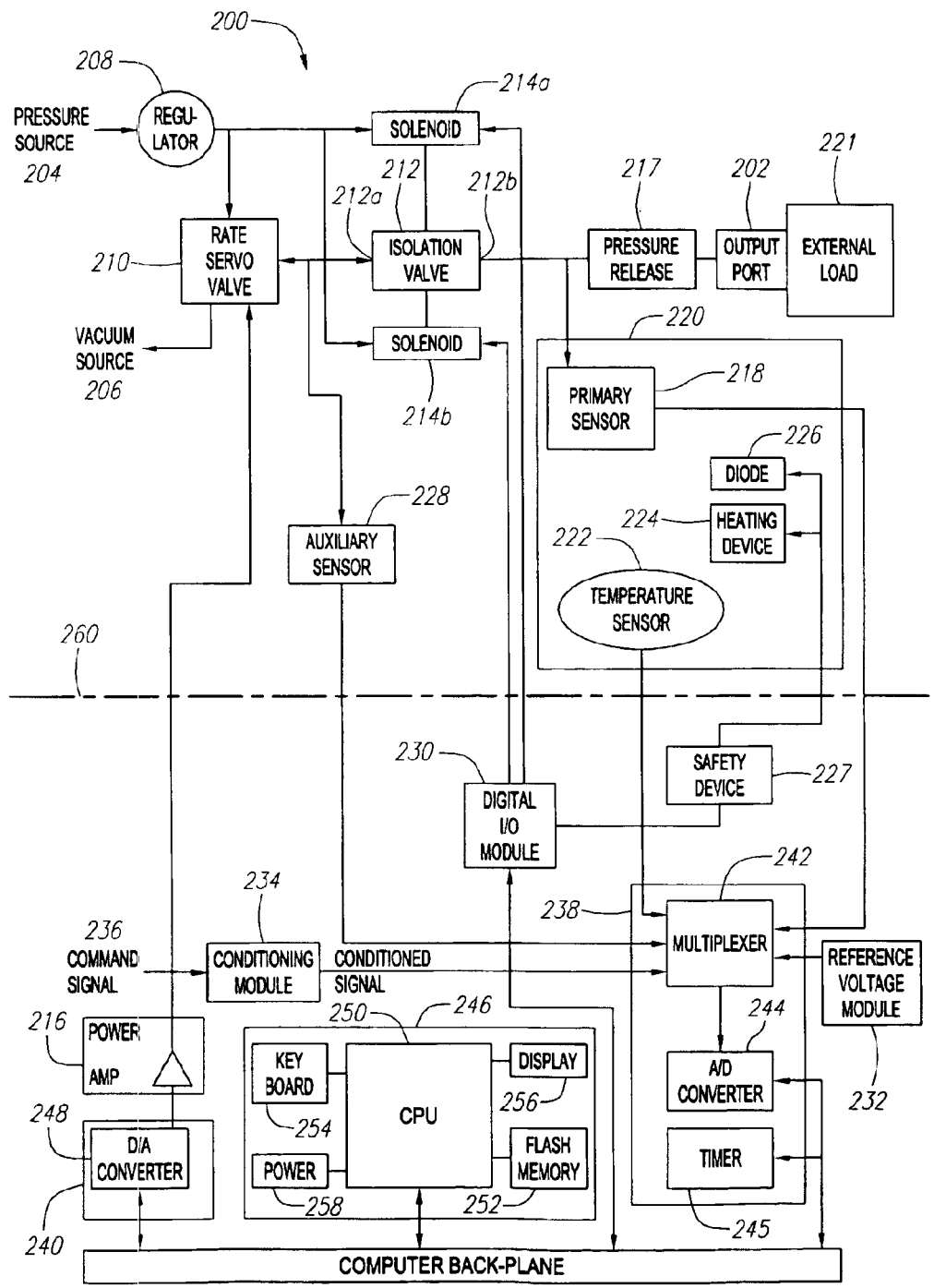
FIG. 2 is a block diagram of a pneumatic function generator system in accordance with a preferred embodiment of the present invention.

Referring now more particularly to the drawings, FIG. 2 is a block diagram of a PFG system 200. The PFG system 200 is a stand-alone system that can be located in an aircraft hanger, an aircraft, a ground vehicle, a testing facility, a laboratory or any other location where simulations can be performed to simulate the operating conditions of an aircraft. The PFG system 200 can generate, control and monitor pneumatic signals relating to the aircraft, such as the altitude, the rate of change in the altitude per minute, the cabin pressure in, for example, pounds per square inch (psi), the ambient pressure, the rate of change in the pressure per minute, the inches of mercury per minute, the airspeed, or other measurements relating to the aircraft. In one embodiment, the PFG system 200 can accurately control the pressure and the pressure rate being output from an output port 202.

The PFG system 200 can include various components or elements such as a pressure source 204, a vacuum source 206, a regulator 208, a rate servo valve 210, an isolation valve 212, a number of solenoids 214, a power amplifier 216, a primary sensor 218, a housing 220, a temperature sensor 222, a heating device 224, a diode 226 (e.g., a light-emitting diode), an auxiliary sensor 228, a digital input-output (I/O) module 230, a reference voltage module 232, a conditioning module 234, an analog-to-digital (A/D) module 238, a digital-to-analog (D/A) module 240 and a computer system 246. The pressure source 204 generates a nominal pneumatic fluid pressure ranging from between about 25 pounds per square inch (psi) to 50 psi and the vacuum source 206 creates a vacuum ranging from between about 0.1 psi and 1.0 psi. The pressure source 204 can be a regulated nitrogen cylinder or a clean compressed air pressure source as commonly available in commercial industrial settings. The vacuum source 206 can be a venturi, vane or wobble type vacuum pump such as model number 2580, manufactured by Welch Vacuum of Skokie, Ill.

During operation of the pressure source 204, the pneumatic fluid can travel through the regulator 208 to ensure that the pressure does not exceed the input design limits of the rate servo valve 210, and other downstream components. That is, the regulator 208 prevents damage to the rate servo valve 210, the isolation valve 212, the primary sensor 218, the auxiliary sensor 228, and any potential external loads 221. In one embodiment, a pressure release valve 217, such as model number 559B-1M-8, manufactured by Circle Seal of Corona, Calif., can be positioned in-line with the output port 202 to prevent excessive pressure from being applied to the external load 221. For example, the pressure release valve 217 can be designed to open if the pressure exceeds a pre-set value of, for example, about 25 psi.

The rate servo valve 210 can be a bipolar device that is electrically actuated to control the rate at which the pressure or vacuum travels to the output port 202. The rate servo valve 210 can have two electrically controlled apertures that open and close depending on the amount of electric current received from the power amplifier 216. For example, in one embodiment, if the rate servo valve 210 receives a positive electric current from the power amplifier 216, the pressure aperture opens admitting pneumatic fluid under pressure, and if the rate servo valve 210 receives a negative electric current from the power amplifier 216, the vacuum aperture opens admitting the vacuum. The greater the amount of positive electric current, the more the pressure aperture is opened, and the greater the amount of negative electric current, the more the vacuum aperture is opened. If the power amplifier 216 outputs no electric current, both apertures are nominally closed. The rate servo valve 210 can be a K.I.M. and Associates (of Camarillo, Calif.), model number 81145, a Ruska model number 81145, or any similar bipolar pneumatic rate servo valve or a matched pair of unipolar rate servo valves where one valve is utilized to meter the pneumatic pressure source 204 and one valve is utilized to meter the vacuum source 206.

The isolation valve 212 can have a first port 212a and a second port 212b and can be used to seal off and isolate the rate servo valve 210 from the output port 202, for example, during a leak check. The isolation valve 212 is capable of providing a solid seal in either direction so that a positive or negative delta pressure can be maintained across the isolation valve 212, which has an equivalent internal bore that is large to allow for high slew rates. In addition, the isolation valve 212 is designed to not produce a significant amount of heat because any warming of the air trapped within the isolated portion of the PPG system 200 during a leak test may cause the air to expand, yielding a false indication or reading to the sensors 218, 228 that a leak does or does not exist. In one embodiment, the isolation valve 212 can be a pneumatically operated spool valve having an equivalent internal bore of about 6.35 millimeters (0.25 inches). For example, the isolation valve 212 can be a spool valve, model number 250A DAP, manufactured by Humphrey Products of Michigan. When the internal bore is open, the isolation valve 212 poses negligible resistance to the flow of gas, such as air or dry nitrogen, through the PFG system 200. When the internal bore is closed, the isolation valve 212 provides a solid seal regardless of the polarity of the delta pressure.

In the illustrated embodiment, a first solenoid 214a and a second solenoid 214b are coupled to the isolation valve 212. The first and second solenoids 214a, 214b can be pilot air solenoid valves capable of controlling the opening and closing of the aperture of the isolation valve 212. For example, each solenoid 214 can be a model number B3E1 BOU 120 VAC solenoid, manufactured by Humphrey Products. The use of pilot air pressure to operate the pneumatically actuated isolation valve 212 provides at least two benefits. First, the pilot air is capable of generating high actuated forces within the isolation valve 212, resulting in positive isolation when isolation is desired, and a large unobstructed bore when isolation is not desired. Second, the use of pilot air to actuate the isolation valve 212 minimizes the possible transfer of heat from the solenoids 214 to the internal bore of the isolation valve 212. In addition, the solenoids 214a, 214b are selected for high voltage coils, for example 115 volts, which serve to further minimize the expression of heat through the reduction of power ($I^2R$) losses. Generally, the pilot air does not come into contact with the flow of gases through the PFG system 200.

The power amplifier 216 can be a multi-channel power amplifier capable of receiving a control signal (e.g., control voltage) from the D/A module 240 and increasing the control signal to a level with sufficient current capacity to drive the rate servo valve 210. The control signal is typically a unipolar (e.g., 0 to 10 volt) signal. The rate servo valve 210 is typically designed to receive a drive signal that is a bipolar (e.g., −5 to +5 volt) signal. Therefore, the power amplifier 216 may offset the control signal to a bipolar signal before increasing the control signal. Generally, the bipolar drive signal requirement of the rate servo valve 210 suggests the need for a bipolar (split) power source. However, the power amplifier 216 is designed around a bridge configuration for providing bipolar control signals to the rate servo valve 210 without requiring a bipolar power supply. In one embodiment, the bridge configuration is based on a pair of PA21 power operational amplifier integrated circuits, manufactured by APEX of Tucson, Ariz.

The primary sensor 218 can be coupled to the second port 212b of the isolation valve 212 and the output port 202 (or pressure release 217) and is capable of measuring the pressure and/or rate of change of pressure at the second port 212b of the isolation valve 212. For example, the primary sensor 218 can be a high precision measuring device capable of measuring the pressure to a precision of about 0.001 inches of mercury. In one embodiment, the primary sensor 218 can be a low hysteresis, high precision quartz pressure sensor, part number 2216167-1, manufactured by Honeywell International, Inc.

The primary sensor 218 can be located within a suitable metallic housing 220, which can provide electrical shielding as well as create a thermally stagnant or "dead" air space around the primary sensor 218. In addition, the interior surface of the housing 220 can be lined with a thermal insulating material. The air space and the thermal insulating material may not be designed to completely isolate the primary sensor 218 from external thermal conditions; but, rather, may be designed to protect the primary sensor 218 from air currents and transient external thermal events. Locating the primary sensor 218 within the housing 220 allows the temperature of the primary sensor 218 to be controlled to provide greater accuracy in measuring pressure because even slight changes in the air temperature within the housing 220 can affect the pressure reading from the primary sensor 218. In one embodiment, the housing 220 can have a length L of about 120 millimeters (mm), a width W of about 120 mm, and a height H of about 60 mm.

Variations in the temperature of the air surrounding the primary sensor 218 can result in undesirable drifts in precision pressure measurements. Even though many conventional pressure sensors employ some manner of electronic or software compensation to account for temperature effects, these schemes are based on approximations, and therefore have limited ability to correct resulting errors. The need for compensation may be avoided by actively measuring and then controlling the temperature of the primary sensor 218.

The temperature of the primary sensor 218 can be measured using the temperature sensor 222 and can be adjusted using the heating device 224. The temperature sensor 222 can be an integrated circuit temperature sensor, part number LM34, manufactured by National Semiconductor of Santa Clara, Calif. The heating device 224 can be a power resistor, for example, a 10 ohm 25 watt power resistor manufactured by Pacific. The primary sensor 218, the temperature sensor 222 and the heating device 224 can be mounted on a metal plate to define a resulting assembly, which can be locating within the housing 220. In one embodiment, the temperature sensor 222 generates an analog voltage that is proportional to the temperature of the resulting assembly. The analog voltage is directed to the A/D module 238, which converts the analog voltage to a numerical value (e.g., a digital value). Using the numerical value, the rate of change of the numerical value, and other factors, such as the time value (discussed below), the computer system 246 determines whether or not additional heat is needed to stabilize temperature variations within the housing 220. If additional heat is needed, the computer system 246 instructs the digital I/O module 230 to activate a solid-state relay, which allows power to be directed from the power supply 258 to the heating device 224.

The computer system 246 controls the temperature within the housing 220 to maintain a target temperature, which, in one embodiment, is about 120 degrees Fahrenheit. The target temperature is generally selected to be higher than normal room temperature (about 70 degrees Fahrenheit). Setting the target temperature to be greater than the normal room temperature assures that the rate of heat flow from the primary sensor 218 and the interior of the housing 220 to the ambient air through radiation is of the same or similar order of magnitude as the rate of heat flow into the primary sensor 218 when the heating device 224 has been activated.

The diode 226 is connected in parallel with the heating device 224 and provides visual indication that the heating device 224 has been activated. A thermal safety cutoff device 227, for example, model number STO-150, manufactured by Stancor of Saint Louis, Mo., may be connected in series with the heating device 224 to disable the heating device 224 in the event that the computer system 246 fails to function properly, and thus is unable to deactivate the heating device 224.

The auxiliary sensor 228 can be coupled to the first port 212a of the isolation valve 212 and is capable of measuring the pressure or rate of change of pressure at the first port 212a of the isolation valve 212. For example, the auxiliary sensor 228 can be a low precision measuring device capable of measuring the pressure to a precision of about 0.06 inches of mercury. In one embodiment, the auxiliary sensor 228 can be a piezo bridge sensor, model number PX138, manufactured by Omega Technologies of Stamford, Conn. The auxiliary sensor 228 generates an analog voltage proportional to the pressure measured at the first port 212a of the isolation valve 212. The analog voltage is directed to the A/D module 238, which converts the analog voltage to a numeric value. The computer system 246 may use the numerical value in the calculations for maintaining closed loop control of the gas pressure.

The digital input-output (I/O) module 230 can include a parallel port I/O device, which allows the computer system 246 to transmit on/off state signals to the various components (e.g., the solenoids 214, the heating device 224 and the diode 226) of the PFG system 200. The digital I/O module 230 can read (receive as an input) and set and reset (transmit as an output) bits under the control of the computer system 246. In one embodiment, the digital I/O module 230 can be a model CIO-DIO48, manufactured by Measurement Computing of Middleboro, Mass.

The digital I/O module 230 can allocate a number of input bits (e.g., 16 bits) for communicating target pressures and target pressure rates to the various components of the PFG system 200. For example, an external instrument (not shown) can communicate with the digital I/O module 230 and apply a bit pattern to the allocated bits representing a desired target pressure or target pressure rate. The digital I/O module 230 can convert the bit pattern to a numeric value, which the computer system 246 may use for maintaining closed loop control of the gas pressure.

The digital I/O module 230 can allocate a number of output bits (e.g., 16 bits) for controlling the various components (e.g., the solenoids 214 and the heating device 224) of the PFG system 200. That is, under the control of the computer system 246, the digital I/O module 230 can set specific bits high to activate solid-state relays, which allow power to be supplied to the solenoids 214 and the heating device 224. Also, the digital I/O module 230 can set specific bits low to deactivate solid-state relays to prevent power from being supplied to the solenoids 214 and the heating device 224.

The reference voltage module 232 can be coupled to the A/D module 238 and is capable of providing a known, substantially constant low reference voltage to the A/D module 238. The reference voltage is a low non-zero value such as 2.0 volts or lower. The reference voltage is used by the PFG system 200 to reduce drift and channel-to-channel crosstalk in the A/D module 238. In one embodiment, the reference voltage module 232 can be model number ADR420BR, manufactured by Analog Devices of Norwood, Mass.

The conditioning module 234 include a connector or port for receiving a command signal 236, preferably an analog command signal, from an external device such as an aircraft cabin pressure controller or other processor control hardware. The command signal 236, which can be a voltage signal having a voltage of between about 0 volts and 10 volts, can be used to represent desired target pressures, e.g., 40 inches of mercury, or desired rates of pressure change, e.g., 5 inches of mercury per second. The conditioning module 234 includes a circuit, which is connected to the connector and is configured to condition the command signal 236 to produce a conditioned signal. For example, the circuit can be configured to limit the command signal 236 to safe levels and reduces the effects of external electrical noise and ground differentials. The circuit can include current limiting resistors, each on the order of about 1,000 ohms, a Zener diode for limiting the command signal to between about 0 volts and 10 volts, capacitors, each on the order of 10 uF for noise suppression and clamping diodes (e.g., model number 1N914) for suppressing excessive ground differentials. The conditioned signal is directed to the A/D module 238 for conversion to a numeric value. The computer system 246 may interpret the numeric value as either a desired target pressure or a desired rate of pressure change.

The A/D module 238 can be coupled to and can receive analog information from the primary sensor 218, the temperature sensor 222, the auxiliary sensor 228, the reference voltage module 232 and the conditioning module 234. The A/D module 238 can include a multiplexer 242 that has a number of channels, for example 8 channels, for receiving and selecting one of the various analog signals and an A/D converter 244 for converting the selected analog signal to a numeric value. Preferably, the multiplexer 242 is an 8-channel device and the A/D converter 244 is a 16-bit device. In one embodiment, the multiplexer 242 and the A/D converter 244 can be combined with buffers and references into a pre-assembled module such as CIO-DAS802/16, manufactured by Measurement Computing.

The D/A module 240 can be coupled to and can receive digital information (e.g., a rate servo valve control signal) from the computer system 246. The D/A module 240 can include a D/A converter 248 for processing the rate servo valve control signal, for example, for converting the rate servo valve control signal from a digital format to an analog format. For example, the digital information can be received by the D/A converter 248, which converts the information to a current or voltage value, for example, a voltage value from between about 0 volts and 10 volts. In one embodiment, the D/A converter 248 can be a D/A converter, model number CIO-DAC02/16, manufactured by Measurement Computing.

The computer system 246 can have a central processing unit (CPU) 250, a memory 252, a keyboard 254, a display 256 and a power supply 258. The computer system 246 is a digital-domain computing device whose operations can be controlled by a software routine. The CPU 250 monitors and controls the components and devices of the PFG system 200. That is, the CPU 250 runs the software routine, which substantially monitors and controls the operations of the components and devices of the PFG system 200. The CPU 250 can receive information from the A/D module 238 and based on the information received, can output a signal to the D/A module 240 for controlling the operations of the rate servo valve 210. The software routine can generate the signal based on the information received from various components and devices, such as the primary sensor 218, the temperature sensor 222, the auxiliary sensor 228, the reference voltage module 232 and the conditioning module 234.

The memory 252 can be a random access memory (RAM), read only memory (ROM), flash memory, combination of these memories, or any other device or combination of devices capable of storing data. The software routine is typically stored in the memory 252, preferably the flash memory, and is retrieved by the CPU 250, which executes the instructions embodied in the software routine. In addition, the memory 252 stores a calibration routine and calibration data typically in the form of a table, which is generally created and stored in the memory 252 prior to performing the simulation. The keyboard 254 can be a standard personal computer (PC) keyboard, whose keys have been relabeled to reflect the key arrangement present on conventional PFG systems. As an alterative to receiving the target pressure and the desired rate via the conditioning module 234, the keyboard 254 can be used to input the target pressure and the desired rate. The display 256 can be a standard video graphics adapter (VGA) liquid crystal display (LCD), whose images are configured to resemble the light emitting diode (LED) displays found on conventional PFG systems. The components and devices of the PFG system 200 can be powered using the 5-volt and 12-volt rail of the power supply 258. In one embodiment, some, and possibly all, of the components and devices above the dashed line 260 can be repeated for each channel, for example for the left channel and the right channel. One skilled in the art will be able to modify the PFG system 200 of FIG. 2 to include multiple channels, for example, two channels.

Figure 3:
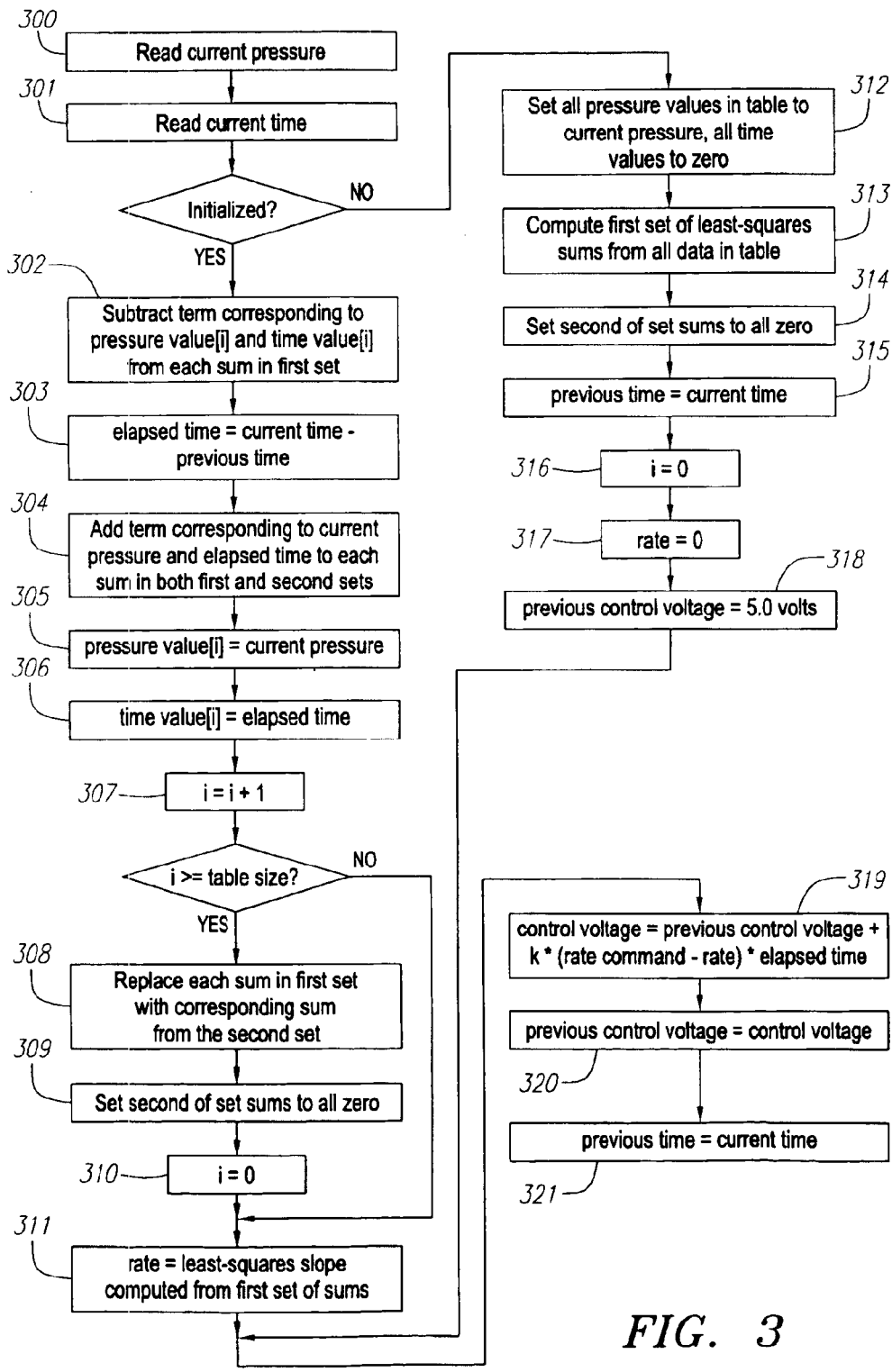
FIG. 3 is a simplified flow chart illustrating a method of controlling the rate servo valve to achieve a desired or specified rate of pressure change in accordance with a preferred embodiment of the present invention.

FIG. 3 is a simplified flow chart illustrating a method of controlling the rate servo valve 210 to achieve a desired target pressure or desired rate of pressure change (i.e., the rate command). Since the rate servo valve 210 controls the rate at which pressure changes, the computer system 246 converts or translates an input command (received from an operator or the computer system 246) to a rate command. For example, to maintain a constant pressure, the computer system 246 sets the rate command to zero. The computer system 246 determines the current pressure by reading the analog output of the primary sensor 218 and converting the analog value to a pressure value using the method described in FIG. 4 (300). The computer system 246 also determines the current time by reading the elapsed time since the last iteration (301 and 303) using the method described below. The computer system 246 determine the current pressure and the current time for n iterations, where n is an integer, and performs a least-squares curve fit using the pressure and time values from the last n iterations. The computer system 246 determines the rate of pressure change by calculating the slope of the least-squares curve fit (302–311). The variable n can be optimized to provide filtering of noise in the rate value due to random variations in the pressure and time values while still minimizing the amount of lag from the input of the curve fitting equations to their output.

The computer system 246 computes the difference between the rate command and the actual rate (as computed from the curve fit), compensates for the difference by adjusting the servo valve control signal (via the D/A module 240) by an amount which is proportional to the difference and to the elapsed time (319) and saves the control signal time for use on the next iteration (320 and 321). The equations used for the least-squares curve fit involve computing several sums, each of which includes one term for each data point (pressure and time value pair). To avoid the processing time required to re-compute every term of each sum for each iteration, the computer system 246 stores each sum from one iteration to the next iteration. Each sum can be calculated by computing the term for the oldest data point, subtracting this term from the sum from the previous iteration (302), and computing the term for the new data point and adding this term to the sum (304). Thus, two terms are computed for each sum, rather than one term for each of the n data points.

One drawback with this method, which is inherent to the way floating numbers are rounded off within the computer system 246, is that there is a higher probability that the round-off error is positive rather than negative. The magnitude of the error for a single calculation is insignificant and the difference in probabilities is so slight that even after performing thousands of calculations, the error will average to be very close to zero. However, when the same calculations are repeated hundreds of times per second over a period of days and the result of each calculation is added to a sum, the total error eventually becomes significant enough to affect the computer system's ability to control the components of the PFG system 200. The computer system 246 precludes this from occurring by computing a second set of sums. Therefore, for each iteration, the new term of each sum in the first set of sums is added to the corresponding sum in the second set (304). On every nth iteration, each sum in the first set is replaced by the corresponding sum in the second set, and all sums in the second set are reset to zero (308–310). Thus, the error is unable to accumulate over a period of more than 2 n iterations, and thus will be insignificant. On the first iteration, the computer system 246 initializes the table of data and the sums used for the least-squares slope computations (312–314) and all other variables that are needed on subsequent iterations (315–318).

The pressure control can be achieved by selecting a rate command that causes the actual pressure to approach the desired pressure. By setting the rate command to a value, which is proportional to the difference between the desired pressure and the actual pressure, the rate of pressure change will decrease to zero as the difference approaches zero, resulting in the pressure being held constant when the actual pressure reaches the desired value. The rate command is limited to a maximum value, which may be set by the operator or the computer system 246. The maximum value results in a sharp "knee" in the function that converts the pressure differential to a rate, which can result in unstable control when the function passes through the knee point as the actual pressure approaches the desired pressure. To eliminate the instability, the function is modified to smoothly transition along an elliptical arc between the segments on the two sides of the knee point.

Figure 4:
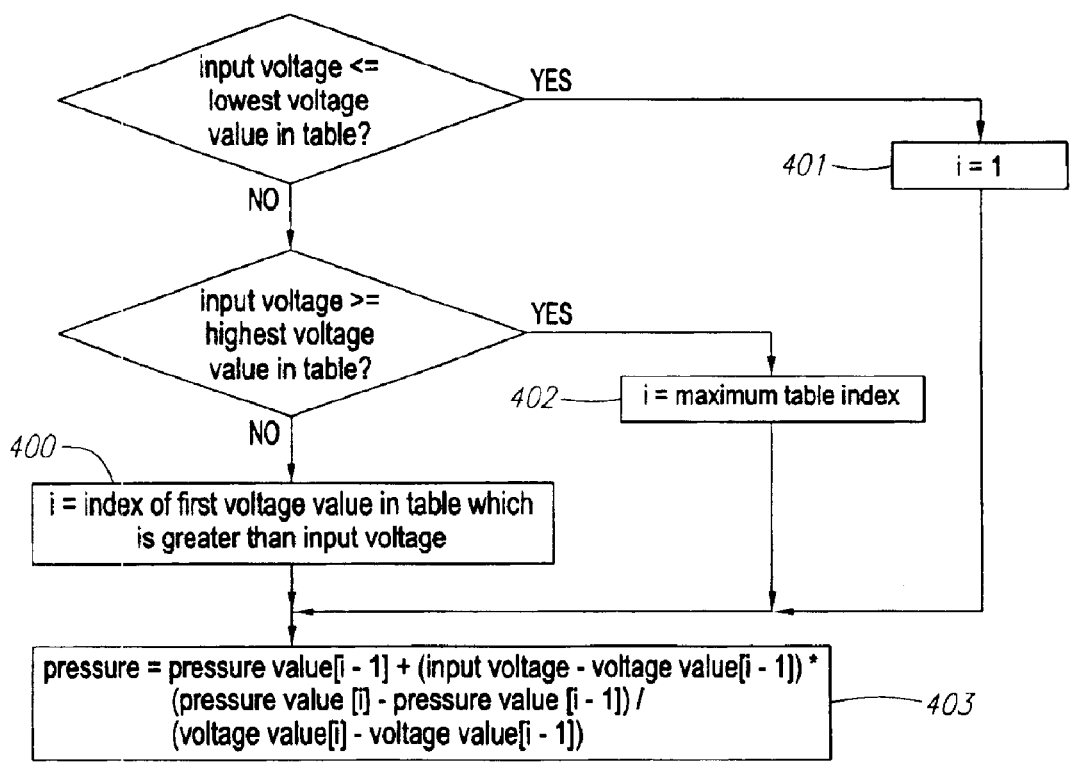
FIG. 4 is a simplified flow chart illustrating an interpolation process for converting the analog output of the primary sensor to a pressure value in accordance with a preferred embodiment of the present invention.

FIG. 4 is a simplified flow chart illustrating an interpolation process for converting the analog output of the primary sensor 218 to a pressure value. The computer system 246 uses a table having specific sensor voltages corresponding to pressures to convert the analog output of the primary sensor 218 to pressure units. When the analog output voltage falls between two sensor voltages in the table, the computer system 246 performs a linear interpolation of the table values to achieve the pressure conversion. The computer system 246 finds the table index of the first voltage value in the table that is greater than the input voltage (400) and performs the interpolation using this voltage value and the one that precedes it and the corresponding pressure values (403). For input voltages less than the lowest value in the table (401) or greater than the highest value (402), the index is chosen which causes the formula (403) to extrapolate the data values which are nearest the input value. Calibration of the pressure includes determining a set of voltages and the corresponding pressures to be loaded into the table.

The computer system 246 can implement the calibration process as follows. A pressure standard can be connected to the controlled pressure output of the instrument to periodically update the current pressure and supply the current pressure value to the instrument via a serial link. The computer system 246 sets the pressure command to each pressure value in the table and allows the pressure to stabilize. The computer system 246 reads the actual pressure from the standard, and creates a new table entry, which includes the voltage value from the existing table entry and the pressure read from the standard. In the event that a pressure standard with a serial output is unavailable, the computer system 246 provides a capability for the operator to manually enter pressure values. After the pressures in the table have been tested, the computer system creates and stores a new calibration table. Each entry in the new table has the same pressure value as the corresponding entry in the original table. The voltage values corresponding to these pressures are computed by a linear interpolation of the pressure and voltage values recorded during the process. After updating the table, the computer system 246 again sets the pressure command to each of the pressures in the table and verifies that it is within tolerance of the pressure reported by the pressure standard.

Figure 5:
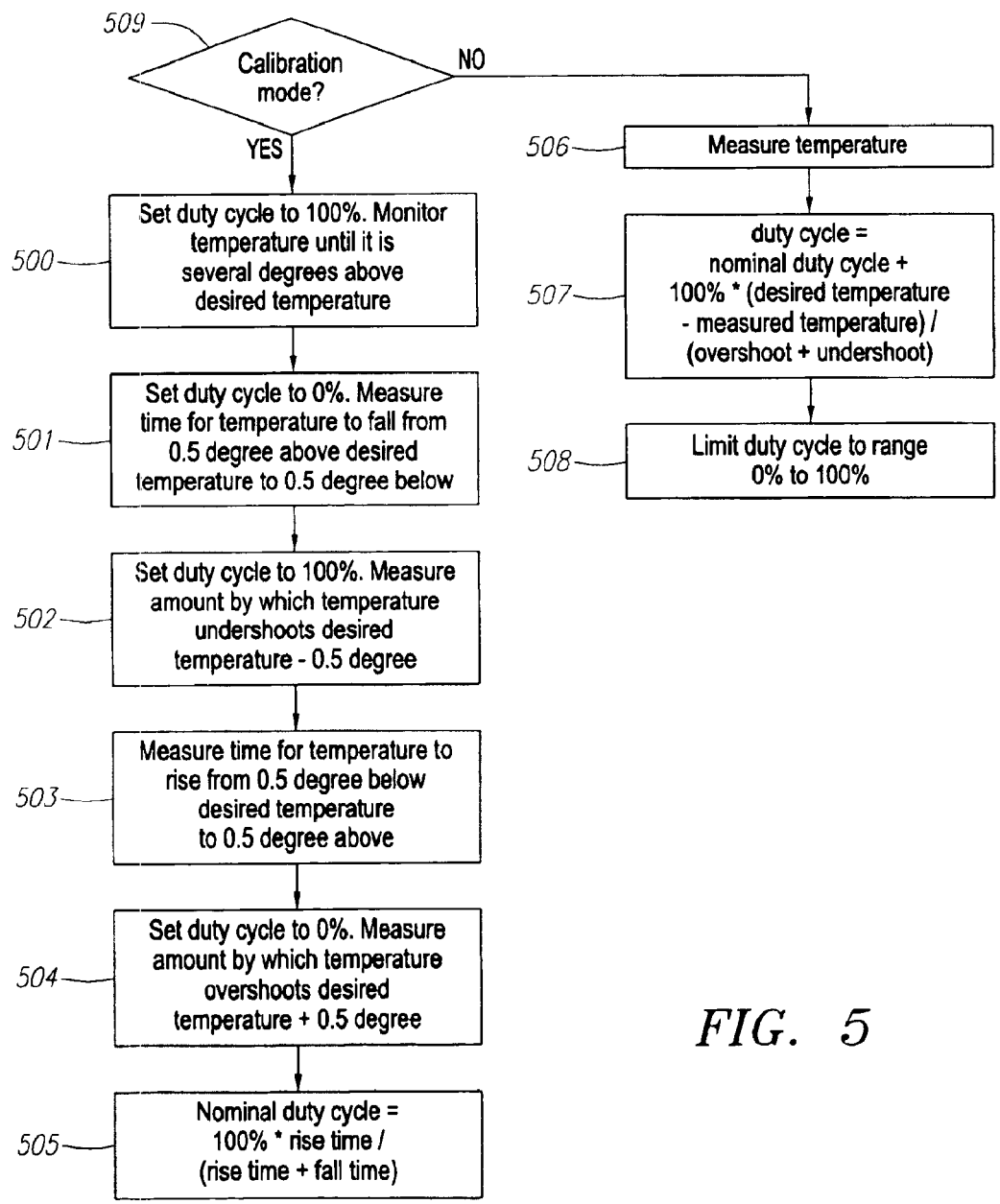
FIG. 5 is a simplified flow chart illustrating a method of controlling the temperature of the primary sensor in accordance with a preferred embodiment of the present invention.

FIG. 5 is a simplified flow chart illustrating a method of controlling the temperature of the primary sensor 218. The computer system 246 can control the temperature by adjusting the duty cycle of the heating device 224. The duty cycle is controlled by switching on and off an output of the digital I/O module 230 that controls power to the heating device 224. The computer system 246 determines a nominal duty cycle, which should result in approximately the desired temperature (500–505). During each iteration, the computer system 246 reads the temperature sensor 222 and converts the analog value to a measured temperature (506), which is compared to the desired temperature. If the measured temperature is greater than the desired temperature, the computer system 246 adjusts the duty cycle downward to cause the temperature to decrease toward the desired value. If the measured temperature is less than the desired temperature, the computer system 246 adjusts the duty cycle upward to cause the temperature to increase toward the desired value. The amount the duty cycle is adjusted is proportional to the difference between the desired temperature and the measured temperature (507). The computer system 246 limits the duty cycle to the range of 0% to 100% (508). The computer system 246 provides a calibration mode 509 to determine the nominal duty cycle for a specific resulting assembly. In the calibration mode, the computer system 246 increases the temperature to above the desired temperature by holding the duty cycle at 100% (500) and measures the time required for the temperature to fall from 0.5 degree above the desired temperature to 0.5 degree below the desired temperature at 0% duty cycle (501). The computer system 246 also measures the time required for the temperature to rise from 0.5 degree below the desired temperature to 0.5 degree above the desired temperature at 100% duty cycle (503). The nominal duty cycle is computed as 100% X (rise time/(rise time+fall time)) (505). The calibration may include two additional measurements. For example, when the computer system 246 switches the duty cycle from 0% to 100% after measuring the fall time, the computer system 246 can measure the amount by which the temperature continues to fall before starting to rise again, which is called the undershoot (502). Similarly, after measuring the rise time, the computer system 246 switches the duty cycle from 100% to 0% and measures the amount by which the temperature continues to rise before starting to fall again, which is called the overshoot (504). The sum of the undershoot and the overshoot is used to scale the amount by which the computer system 246 adjusts the nominal duty cycle to compensate for differences between the measured temperature and the desired temperature (507). The calibration normally needs to be performed only once for a specific temperature sensor 222.

The computer system 246 uses a fixed voltage reference to compensate for drift and crosstalk within the A/D module 238. Crosstalk compensation is achieved by assuming that the level of crosstalk on any channel is a linear function of the total voltage present on all other channels. The computer system 246 provides a calibration mode to determine the coefficients (slope and offset) of this linear function. In the calibration mode, the computer system 246 causes the pressure to vary from minimum to maximum values, thus creating a wide range of analog input values. At each pressure, the computer system 246 reads all input channels and uses a least-squares curve fit to derive the coefficients of a linear function relating the variation in the readings of the voltage reference channel to the average voltage on all other channels. Once these coefficients are derived, the computer system 246 uses this function to compensate the A/D readings for crosstalk. The average value of the most recent reading of all the channels except the channel in question is used as an input to the function, and the function's output is added to the A/D reading of the channel in question. Drift compensation is accomplished by computing the difference between the voltage reference's nominal value and the (crosstalk compensated) A/D reading of the voltage reference channel. The difference is added to the (crosstalk compensated) A/D reading for any other channel.

The computer system 246 can allow the pressure and/or the pressure rate to be controlled via an external signal, which can be either an analog signal or a digital signal. In the case of the analog signal, the computer system 246 reads the numeric value of the signal through the A/D module 238. In the case of the digital signal (e.g., 16-bit digital signal), the computer system 246 reads a 16-bit integer through the digital I/O module 230. In either case, the computer system 246 translates the numeric value to either a rate command or a pressure command via a translation table. The table can take the same form as the table used to translate the pressure sensor's analog output to a pressure value and the actual translation can be performed by the same function. The rate command or pressure command thus derived is then used in either the rate control process or the pressure control process described above.

The precise time values needed for the rate calculations described above are derived from a timer or counter circuit 245, which is clocked by a precision oscillator running at approximately 1 MHz, which provides a resolution of approximately 1 microsecond. The counter circuit 245 can be 16-bits wide, which gives a maximum count of 65535, or 65.535 milliseconds. The computer system 246 can extend the counter to 64 bits, which allows measurement of times up to greater than 580,000 years.

The method of determining the time elapsed between any two events is as follows. On the first event, the computer system 246 reads the 16-bit hardware counter and uses this value to update the 64-bit software counter, and then saves the current value of the 64-bit counter. On the second event, the computer system 246 again reads the hardware counter and updates the software counter, and then computes the difference between the current value of the software counter and the value saved on the first event. This difference is divided by the oscillator frequency (in Hertz) to yield the elapsed time in seconds.

The computer system 246 provides a calibration mode, which allows an operator to measure the oscillator frequency with a precision frequency counter and enter the measured value. Extending the 16-bit hardware counter to 64-bits requires that the computer system 246 detect each time that the hardware counter rolls over from its maximum value (65535) to zero. The computer system 246 performs this by comparing the current hardware counter reading to the preceding reading, and if the current reading is less than the preceding one, then the 16-bit counter has rolled over at least once and 65536 is added to the 64-bit total. To ensure that the counter does not roll over more than once between readings, the computer system 246 updates the 64-bit count at a frequency greater than that at which rollovers occur. Because the nominal time between rollovers is 65.536 milliseconds, the time between updates must be less than this number. The computer system 246 is designed such that the maximum time is less than one millisecond.

Although an exemplary embodiment of the invention has been shown and described, many other changes, combinations, omissions, modifications and substitutions, in addition to those set forth in the above paragraphs, may be made by one having skill in the art without necessarily departing from the spirit and scope of this invention. Accordingly, the present invention is not intended to be limited by the preferred embodiments, but is to be defined by reference to the appended claims.

What is claimed is:

1. A pneumatic function generator system for maintaining a desired pressure or a desired rate of pressure change with respect to time, comprising:

a servo valve for controlling the amount of fluid traveling therethrough;

a primary sensor for measuring the pressure of the fluid and for generating an analog signal corresponding to the pressure of the fluid;

a housing defining a chamber;

a temperature sensor disposed in the chamber for measuring the temperature of the primary sensor;

a heating device disposed in the chamber, for adjusting the temperature of the primary sensor;

an analog-to-digital module for converting the analog signal to a digital value; an input port, coupled to the analog-to-digital module, for receiving an external analog rate or pressure command signal; and a digital device for receiving the digital value and, depending on the digital value, generating a control signal that is used to control the opening and closing of the servo valve.

2. The system as defined in claim 1, further comprising:

a digital-to-analog converter for converting the control signal to an analog control voltage; and a power amplifier for amplifying the analog control voltage and for offsetting the analog control voltage to produce a bipolar signal that is used to control the opening and closing of the servo valve.

3. The system as defined in claim 2, wherein the servo valve is a bipolar device having a plurality of electrically controlled apertures that open and close depending on the bipolar signal.

4. The system as defined in claim 1, farther comprising an isolation valve having a first port coupled to the servo valve, a second port coupled to the primary sensor and an aperture between the first port and the second port, wherein the isolation valve is capable of isolating the servo valve from the primary sensor.

5. The system as defined in claim 4, further comprising a solenoid, coupled to the isolation valve, for controlling the opening and closing of the aperture of the isolation valve.

6. The system as defined in claim 4, further comprising an auxiliary sensor coupled to the first port of the isolation valve, for measuring the pressure of the fluid and for generating a pressure signal corresponding to the pressure of the fluid.

7. The system as defined in claim 1, wherein:

the primary sensor is disposed in the chamber of the housing; and the temperature sensor and the heating device are coupled to the analog-to-digital module.

8. The system as defined in claim 1, further comprising a digital input/output module coupled to the digital device end the heating device, wherein the digital device is configured to receive a measured temperature value from the temperature sensor, and based on the measured temperature value, command the digital input/output module to provide or terminate power to the heating device.

9. The system as defined in claim 1, wherein the analog-to-digital module includes:

a multiplexer for receiving the analog signal; and an analog-to-digital converter for converting the analog signal to the digital value.

10. The system as defined in claim 1, further comprising a conditioning module having a circuit coupled to the analog-to-digital module and configured to receive a desired pressure signal.

11. The system as defined in claim 10, wherein the circuit includes a diode for limiting the voltage of the desired pressure signal and a capacitor for attenuating the noise in the desired pressure signal.

12. A pneumatic function generator system for maintaining a desired pressure or a desired rate of pressure change with respect to time, comprising:

a servo valve for controlling the amount of fluid traveling therethrough;

a primary sensor for measuring the pressure of the fluid and for generating a primary analog pressure signal corresponding to the pressure of the fluid;

an auxiliary sensor for measuring the pressure of the fluid and for generating an auxiliary analog pressure signal corresponding to the pressure of the fluid an analog-to-digital module for converting the primary and the auxiliary analog pressure signals to primary and auxiliary digital pressure values, respectively;

an input port, coupled to the analog-to-digital module, for receiving an external analog rate or pressure command signal; and a digital device for receiving the primary and auxiliary digital pressure values and, depending at least on the primary digital pressure value, generating a control signal that is used to control the opening and closing of the servo valve.

13. The system as defined in claim 12, further comprising:

a digital-to-analog converter for converting the control signal to an analog control voltage; and a power amplifier for amplifying the analog control voltage and for offsetting the analog control voltage to produce a bipolar signal that is used to control the opening and closing of the servo valve.

14. The system as defined in claim 13, wherein the servo valve is a bipolar device having a plurality of electrically controlled apertures that open and close depending on the bipolar signal.

15. The system as defined in claim 12, further comprising a solenoid, coupled to the isolation valve, for controlling the opening and closing of the aperture of the isolation valve.

16. The system as defined in claim 12, further comprising:

a housing defining a chamber a temperature sensor disposed in the chamber, for measuring the temperature of the primary sensor; and a heating device disposed in the chamber, for adjusting the temperature of the primary sensor.

17. The system as defined in claim 12, wherein:

the primary sensor is disposed in the chamber of the housing; and the temperature sensor and the heating device are coupled to the analog-to-digital module.

18. The system as defined in claim 12, further comprising a digital input/output module coupled to the digital device and the healing device, wherein the digital device is configured to receive a measured temperature value from the temperature sensor, and based on the measured temperature value, command the digital input/output module to provide or terminate power to the heating device.

* * * * *

UNITED STATES PATENT AND TRADEMARK OFFICE
CERTIFICATE OF CORRECTION

PATENT NO. : 6,955,184 B2
APPLICATION NO. : 10/447805
DATED : October 18, 2005
INVENTOR(S) : Hans Peter Friedrichs It is certified that error appears in the above-identified patent and that said Letters Patent is hereby corrected as shown below:

In Column 4, line 35, please add --Kalamazoo,-- before "Michigan".
In Column 13, line 14, delete "farther" and add --further--.
In Column 14, line 9, add --;-- after "fluid".
In Column 14, line 38, add --;-- after "chamber".

Signed and Sealed this

Second Day of October, 2007

JON W. DUDAS
*Director of the United States Patent and Trademark Office*